US010704470B2

(12) United States Patent
Tinschmann et al.

(10) Patent No.: US 10,704,470 B2
(45) Date of Patent: Jul. 7, 2020

(54) DUAL-FUEL INTERNAL COMBUSTION ENGINE (71) Applicant: INNIO Jenbacher GmbH & Co OG, Jenbach, Tirol (AT)

(72) Inventors: Georg Tinschmann, Schwaz (AT); Dino Imhof, Baden (CH); Michael V. Hillebrecht, Prague (CZ)

(73) Assignee: INNIO JENBACHER GMBH & CO OG, Jenbach (AT)

(*) Notice: Subject to any disclaimer, the term of this patent is extended or adjusted under 35 U.S.C. 154(b) by 0 days.

(21) Appl. No.: 16/063,438

(22) PCT Filed: Dec. 14, 2016

(86) PCT No.: PCT/AT2016/060124
§ 371 (c)(1),
(2) Date: Jun. 18, 2018

(87) PCT Pub. No.: WO2017/112966
PCT Pub. Date: Jul. 6, 2017

(65) Prior Publication Data
US 2019/0063339 A1 Feb. 28, 2019

(30) Foreign Application Priority Data
Dec. 29, 2015 (AT) .............. A 51110/2015

(51) Int. Cl.
F02D 19/06 (2006.01)
F02D 19/10 (2006.01)
F02D 41/00 (2006.01)

(52) U.S. Cl.
CPC ........ F02D 19/0615 (2013.01); F02D 19/06 (2013.01); F02D 19/0628 (2013.01);
(Continued)

(58) Field of Classification Search
CPC .. F02D 19/0615; F02D 19/06; F02D 19/0628; F02D 19/0642; F02D 19/105;
(Continued)

(56) References Cited

U.S. PATENT DOCUMENTS 5,370,097 A * 12/1994 Davis ................ F02D 19/0631
123/27 GE
6,101,986 A 8/2000 Brown et al.
(Continued)

FOREIGN PATENT DOCUMENTS

DE 102008007325 A1 8/2009
DE 102013213349 A1 10/2014
(Continued)

OTHER PUBLICATIONS

Office Action issued in connection with corresponding AT Application No. A51110/2015 dated Jul. 5, 2016 (English Translation not available).
PCT Written Opinion of the International Searching Authority for PCT Application No. PCT/AT2016/060124 dated Apr. 10, 2017; 4 pgs.

Primary Examiner — Mahmoud Gimie
(74) Attorney, Agent, or Firm — Fletcher Yoder, P.C.

(57) ABSTRACT

Dual-fuel internal combustion engine with at least two combustion chambers which have a different distance from at least one gas mixer for producing a gas-air mixture, whereby an inlet valve for the gas-air mixture and an injector for liquid fuel is assigned to each of the combustion chambers, and a control device is provided which is configured in a change-over mode to change an amount of energy supplied to the at least two combustion chambers through the gas-air mixture in a first direction, and to change an amount of liquid fuel supplied to the at least two combustion chambers in an opposite, second direction, whereby the control device is designed to determine a time for the change of the amount of liquid fuel in the second direction for each of the at least (Continued)

two combustion chambers according to the distance of the respective combustion chamber from the at least one gas mixer.

20 Claims, 4 Drawing Sheets

(52) U.S. Cl.
CPC ......... *F02D 19/0642* (2013.01); *F02D 19/10* (2013.01); *F02D 19/105* (2013.01); *F02D 41/008* (2013.01); *F02D 41/0025* (2013.01); *F02D 41/0082* (2013.01); *Y02T 10/36* (2013.01)

(58) Field of Classification Search
CPC . F02D 41/0025; F02D 41/008; F02D 41/0082
USPC ............................................. 123/435, 27 GE
See application file for complete search history.

(56) References Cited

U.S. PATENT DOCUMENTS

| | | | |
|---|---|---|---|
| 10,287,997 B2 | 5/2019 | Flohr et al. | |
| 2010/0332106 A1 | 12/2010 | Vanderslice et al. | |
| 2012/0266846 A1* | 10/2012 | Kilbourne | F02M 43/00 |
| | | | 123/478 |
| 2015/0252741 A1* | 9/2015 | Sixel | F02D 19/0642 |
| | | | 123/472 |
| 2016/0040609 A1 | 2/2016 | Flohr et al. | |

FOREIGN PATENT DOCUMENTS

| | | |
|---|---|---|
| DE | 102013215924 A1 | 2/2015 |
| JP | H02-305314 A | 12/1990 |

* cited by examiner

DUAL-FUEL INTERNAL COMBUSTION ENGINE

TECHNOLOGY FIELD

The present disclosure relates to a dual-fuel internal combustion engine that is able to receive a gas-air mixture and/or a liquid fuel to power at least two combustion chambers. The at least two combustion chambers may be positioned at different distances from a gas mixer that supplies the gas-air mixture to the dual-fuel internal combustion engine. In some cases, the dual-fuel internal combustion engine may switch between primarily liquid fuel supply and primarily gaseous fuel supply. During the change-over between such operation, a control system may delay a change in an amount of liquid fuel injection to the at least two combustion chambers based on the respective distances of the at least two combustion chambers from the gas mixer.

BACKGROUND

Dual-fuel internal combustion engines are typically operated in several operating modes. In this case, we differentiate an operating mode with a primary liquid fuel supply ("liquid operation" for short; in the case of the use of diesel as a liquid fuel, it is called "diesel operation") and an operating mode with primarily gaseous fuel supply, in which the liquid fuel serves as a pilot fuel for initiating combustion (called "gas operation" or also "pilot operation" or "ignition jet operation"). An example of the liquid fuel is diesel. It could also be heavy oil or another self-igniting fuel. An example of the gaseous fuel is natural gas. Other gaseous fuels such as biogas, etc. are also suitable.

In pilot operation, a small amount of liquid fuel is introduced into a piston cylinder unit as a so-called pilot injection. As a result of the conditions prevailing at the time of injection, the introduced liquid fuel ignites and detonates a mixture of gaseous fuel and air present in a combustion chamber of the piston cylinder unit. The amount of liquid fuel in a pilot injection is typically 0.5-5% of the total amount of energy supplied to the piston cylinder unit in a work cycle of the internal combustion engine.

The substitution rate indicates the proportion of the energy supplied to the internal combustion engine in the form of the gaseous fuel. Substitution rates of between 95 and 99.5% are targeted.

In addition, there is still a mixed operation, in which substitution rates of less than 95% are used.

Moreover, it is known that the internal combustion engine or control unit can be operated in a changeover mode, which is used to switch between the different operating modes during operation. In principle, in the changeover mode, an amount of energy supplied to at least two combustion chambers through the gas-air mixture is changed in a first direction, and an amount of liquid fuel supplied to the at least two combustion chambers is changed in an opposite second direction.

U.S. Pat. No. 7,913,673 A1 discloses a dual-fuel internal combustion engine. A disadvantage of the dual-fuel internal combustion engine of this reference is that an undesirable deviation of the rotational speed or the torque up to the so-called overfueling can occur during a changeover phase, for example from liquid operation to pilot operation. In a critical case, too much energy is supplied to the internal combustion engine.

Internal combustion engines of this type may have a central gas mixer for the at least two combustion chambers. The distance of the at least two combustion chambers from the at least one gas mixer results in a transport delay of the gas-air mixture. The disadvantage of this is that the internal combustion engine can therefore behave unpredictably in the changeover phase.

SUMMARY

The object of the disclosure is to provide a dual-fuel internal combustion engine of this type and a corresponding method in which a more uniform and predictable behavior can be achieved than in the prior art in the changeover phase.

This object is achieved with regard to the dual-fuel internal combustion engine that includes a control system that delays a change in amount of liquid fuel injection into at least two combustion chambers based on respective distances of the at least two combustion chambers from a gas mixer that supplies a gas-air mixture to the at least two combustion chambers.

From the prior art, it is already known globally for all combustion chambers of the internal combustion engine that the change in the amount of energy in liquid fuel can be made after the change in the amount of energy introduced through the gas-air mixture.

The disclosure has recognized that different distances between the at least one gas mixer and the combustion chambers occur in the same nonuniform and unpredictable states.

In order to remedy this, it is proposed to establish a time for the change in the amount of liquid fuel in the second direction for each of the at least two combustion chambers according to the distance of the respective combustion chamber from the at least one gas mixer. This can be done in different ways.

For the purposes of the disclosure, the distance between the gas mixer and the at least one combustion chamber is understood to be a route that the gas-air mixture must cover from a flow technology viewpoint in order to reach a combustion chamber or a group of combustion chambers.

The at least one gas mixer can be designed as a central gas mixer for all combustion chambers of the internal combustion engine. Alternatively, two or more gas mixers can also be provided, each of which supplies a group of combustion chambers with a gas-air mixture.

One aspect of the disclosure is therefore that, for each of the combustion chambers or for groups of combustion chambers, the amount of liquid fuel is changed only for the work cycle in which a composition of the gas-air mixture that is changed by the at least one gas mixer, reaches the combustion chamber or the group of combustion chambers.

A work cycle (also called a combustion cycle) of a combustion chamber is the process of charging the combustion chamber with combustible contents, igniting it and then discharging the resulting substance content of the combustion chamber. In a four-stroke internal combustion engine, this therefore comprises two full revolutions of the crankshaft.

When the amount of energy supplied by the gas-air mixture is changed in a first direction, for example increased, the amount of energy supplied by the liquid fuel must be changed in the opposite second direction, in other words reduced in this case. This applies on the premise that the power of the internal combustion engine must not be changed. Thus, the main application area of the disclosure is a changeover between different modes in a dual-fuel internal combustion engine, while the power and rotational speed of the internal combustion engine remains essentially the same.

Indeed, in practice, some work cycles between the changes in the amounts of energy supplied by the gas-air mixture and by the liquid fuel may take place at different distances from combustion chambers that are distant from at least one gas mixer.

In a plurality of combustion chambers, the control device is designed to determine a time for the change in the amount of liquid fuel for the combustion chambers according to an individual distance of the respective combustion chamber from at least one gas mixer. From this, it can be seen that the amount of liquid fuel is changed sequentially in the second direction according to the distance from the at least one gas mixer. This allows a very accurate matching of the amount of liquid fuel to the spread of the changed concentration in the gas-air mixture in a gas-air mixture supply for the combustion chambers.

However, in the case of a plurality of combustion chambers, they can be organized in the control device into at least two groups, said groups having a different distance from the at least one gas mixer, whereby the control device is designed to determine a time for the change in the amounts of liquid fuel for the at least two groups according to a distance between the at least two groups of the gas mixer. This is a good compromise of good adjustment of the amount of liquid fuel and a simple control of the changeover process.

The division of the combustion chambers into two groups represents a first, simple embodiment of the disclosure. Of course, it is also possible to divide them into more than two groups until the already mentioned combustion chamber-specific changes go the amounts of energy introduced by the gas-air mixture and liquid fuel.

It may be provided that the setpoint value of the start of an injection of the liquid fuel into one of the combustion chambers is selected according to its membership of one of the at least two groups. In an alternative embodiment, a combustion chamber-specific setpoint value can be selected for the start of the injection of liquid fuel.

The later change in the amount of energy supplied by the liquid fuel according to the disclosure does not need to be performed every time the amount of energy supplied by the gas-air mixture is changed. For example, if only relatively small changes in the gas-air mixture are performed in a mixing operation of the dual-fuel internal combustion engine, the later change in the amount of energy supplied by the liquid fuel can be dispensed with.

It may be provided that the control device is designed to select a time interval between the change in the second direction and the change in the first direction according to an ignition sequence. As an example of the consideration of the ignition sequence in the time interval between the change in the first direction and the change in the second direction, a calculated distance between the respective combustion chamber and the at least one gas mixer can be corrected using a correction factor determined from the ignition sequence.

The transport time is primarily determined by the technical flow distance between the at least one gas mixer and the respective group of combustion chambers. Corrections of the transport time can be indicated due to variable air mass flows (load or speed). Of course, the time interval can also be calculated for each combustion chamber individually.

It may also be provided that the start of the injection of the liquid fuel into a combustion chamber is corrected according to the mixture temperature present in this combustion chamber and/or the knocking tendency to be expected in this combustion chamber. In this way, for example, knocking can be prevented by shifting the time for the start of the injection of the liquid fuel to a later time (closer to the top dead center) when too high mixing temperatures indicate a too high knocking tendency.

In addition, at least one cylinder pressure sensor is provided for measuring a pressure flow in the at least one combustion chamber, whereby signals from the at least one cylinder pressure sensor can be supplied to the control device, and the control device is designed for this, in order to correct the change in the amount of energy supplied by the liquid fuel and/or the start of the injection of the liquid fuel into a combustion chamber for one of the at least two combustion chambers according to the signals of the at least one cylinder pressure sensor.

If the at least one cylinder pressure sensor shows, for example, that the peak pressure is too high in a certain combustion chamber, in a later work cycle a reduction in an amount of energy supplied via the liquid fuel or a shift in the injection of the liquid fuel can be performed later (closer to the top dead center). Of course, other characteristic values of the combustion (e.g. combustion focus) can also be used instead of the peak pressure. If the signals of the at least one cylinder pressure sensor indicate too low pressures (peak pressure, combustion characteristic values), then the amount of energy introduced can be increased and/or the injection can be performed earlier.

A cylinder pressure sensor for each combustion chamber or a single cylinder pressure sensor for a combustion chamber of the internal combustion engine can be provided. It is also possible to use cylinder pressure sensors for more than one but not all combustion chambers.

In a further embodiment, the control device can be designed to select the time interval between the change in the second direction and the change in the first direction according to a change in a substitution rate and/or the start of an injection of the liquid fuel. In the case of a stronger change in the substitution rate, a larger time interval will tend to be selected, since otherwise the risk of knocking of individual or multiple combustion chambers becomes higher. As an example of the consideration of the substitution rate and/or the start of an injection of the liquid in the time interval between the change in the first direction and the change in the second direction, a calculated distance between the respective combustion chamber and the at least one gas mixer can be corrected using a correction factor determined from the ignition sequence.

In general, the amount of energy supplied to the combustion chambers by the gas-air mixture or liquid fuel is controlled by the respective amounts of liquid fuel that are injected into the at least two combustion chambers through the injector or the amount of gas admixed through the gas mixer with an air stream. However, this is not the case in all situations. For example, in the case of a dual-fuel internal combustion engine, a turbocharger is used with a device for setting the charging pressure (blow-off valve or wastegate), the amount of admixed gas can be reduced, and at the same time the loading pressure can be increased. It should be noted here that in mixed-loaded internal combustion engines, the setting of the mixture charging pressure is meant, and in the case of air-charged internal combustion engines, the setting of the charging pressure is meant.

The amount of energy supplied to the at least two combustion chambers through the gas-air mixture can then be substantially identical. These relationships are known to the person skilled in the art and the amounts of energy fed to at least two combustion chambers can usually be calculated relatively simply (for example, from the air excess lambda or from a mass of the supplied fuels).

BRIEF DESCRIPTION OF THE DRAWINGS

Further details of the disclosure can be found in the figures and the related description of the figures. They are as follows.

DETAILED DESCRIPTION

Figure 1A:
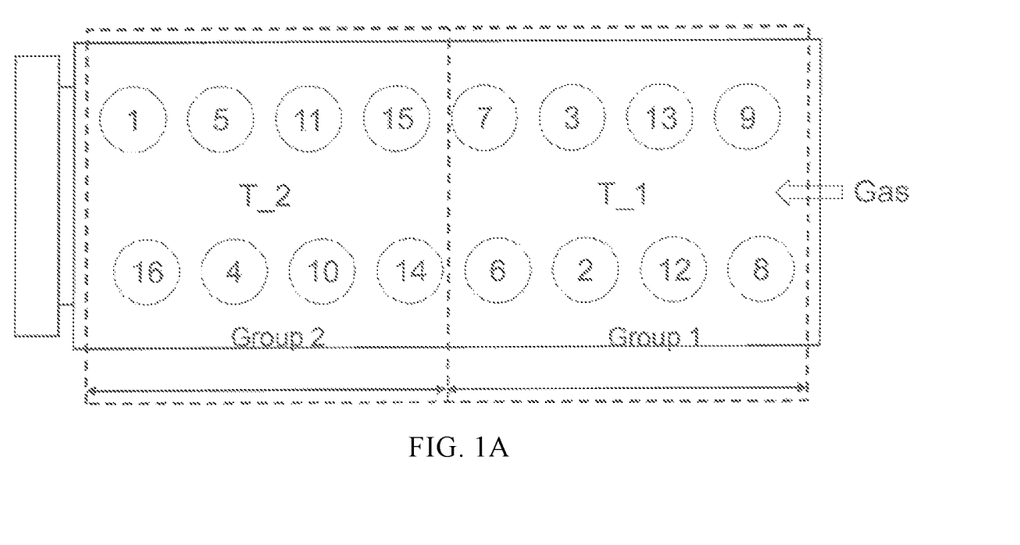
FIGS. 1A to 1C show some figures for the clarification of a first exemplary embodiment of a dual-fuel internal combustion engine according to the disclosure and a method according to the disclosure.

FIG. 1A shows schematically a dual-fuel internal combustion engine with 16 combustion chambers. These combustion chambers are numbered consecutively from 1 to 16 according to the ignition sequence. It is schematically indicated that the gas-air mixture arrives in the individual combustion chambers from a gas mixer located on the right-hand side of the internal combustion engine. The combustion chambers are organized into two groups (Group 1 and Group 2).

Figure 1B:
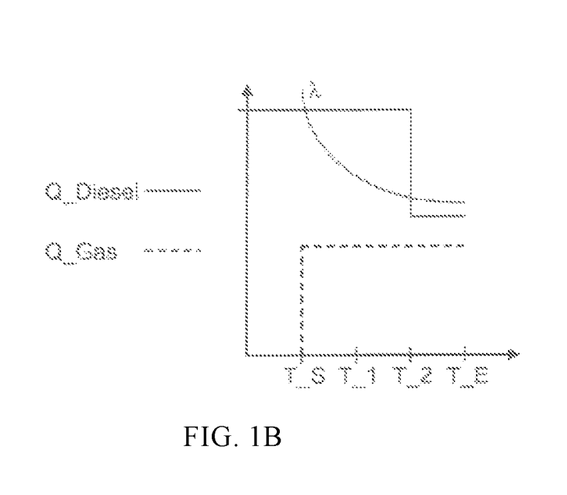
Figure 1C:
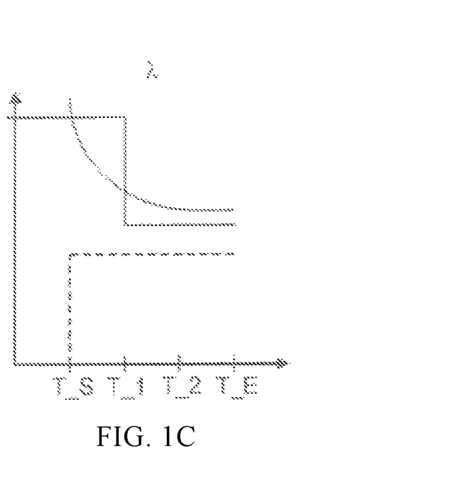

FIGS. 1B and 1C show the course of the amounts of gas and liquid fuel that are present in the combustion chambers of the two groups. The time curve of the air excess lambda is also shown.

In all exemplary embodiments, diesel is used as a liquid fuel.

FIG. 1B shows the different amount trends for Group 2, and FIG. 1C is analogous in relation to Group 1.

At the time T_S, gas is admixed via the gas mixer. This gas will reach Group 1 faster than Group 2. Therefore, in the case of Group 1, the diesel amount is withdrawn at time T_1. In the case of Group 2, this occurs only at a later time T_2. At the end of the changeover operation (time T_E), an equal ratio exists in all combustion chambers between the gas amount Q_Gas and the diesel amount Q_Diesel. The air excess lambda is also adjusted.

During the changeover, it is also provided to correct the start of the injection of the liquid fuel, in this case diesel, according to the mixture temperature present in the respective combustion chamber and the knocking tendency expected in this combustion chamber. The setpoint value to be corrected for the start of the diesel injection is thus dependent on which group the respective combustion chamber belongs to.

In FIG. 1A, the combustion chambers are numbered by their positions in the ignition sequence. The ignition sequence can be used to determine the time for the change to the second direction (withdrawal of the diesel amount). For example, for the combustion chamber with number 1 in the ignition sequence, a calculated distance of Group 2 from the gas mixer can be corrected using a correction factor. The correction factor may, for example, be additive or multiplicative. Due to its position 1, which is far away from the gas mixer and therefore, at a specific time, has a lower gas concentration than, for example, the combustion chamber with position 15, an effective expansion of the calculated distance is indicated in this case by the correction factor (i.e. the amount of diesel is later withdrawn).

Figure 2:
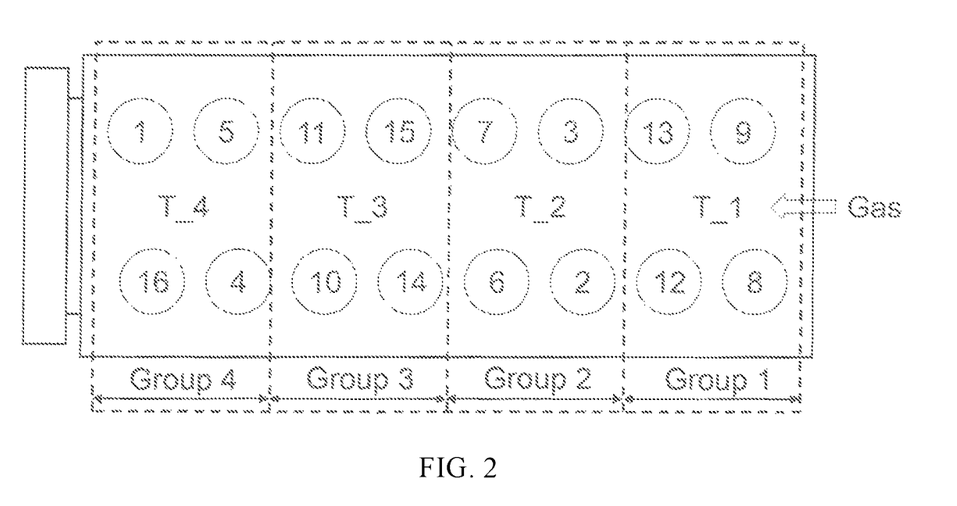
FIG. 2 shows a second exemplary embodiment.

FIG. 2 shows an alternative exemplary embodiment. Here, the combustion chambers of the dual-fuel internal combustion engine are divided into four groups. Otherwise, this exemplary embodiment is analogous to the one shown in FIGS. 1A to 1C.

Figure 3:
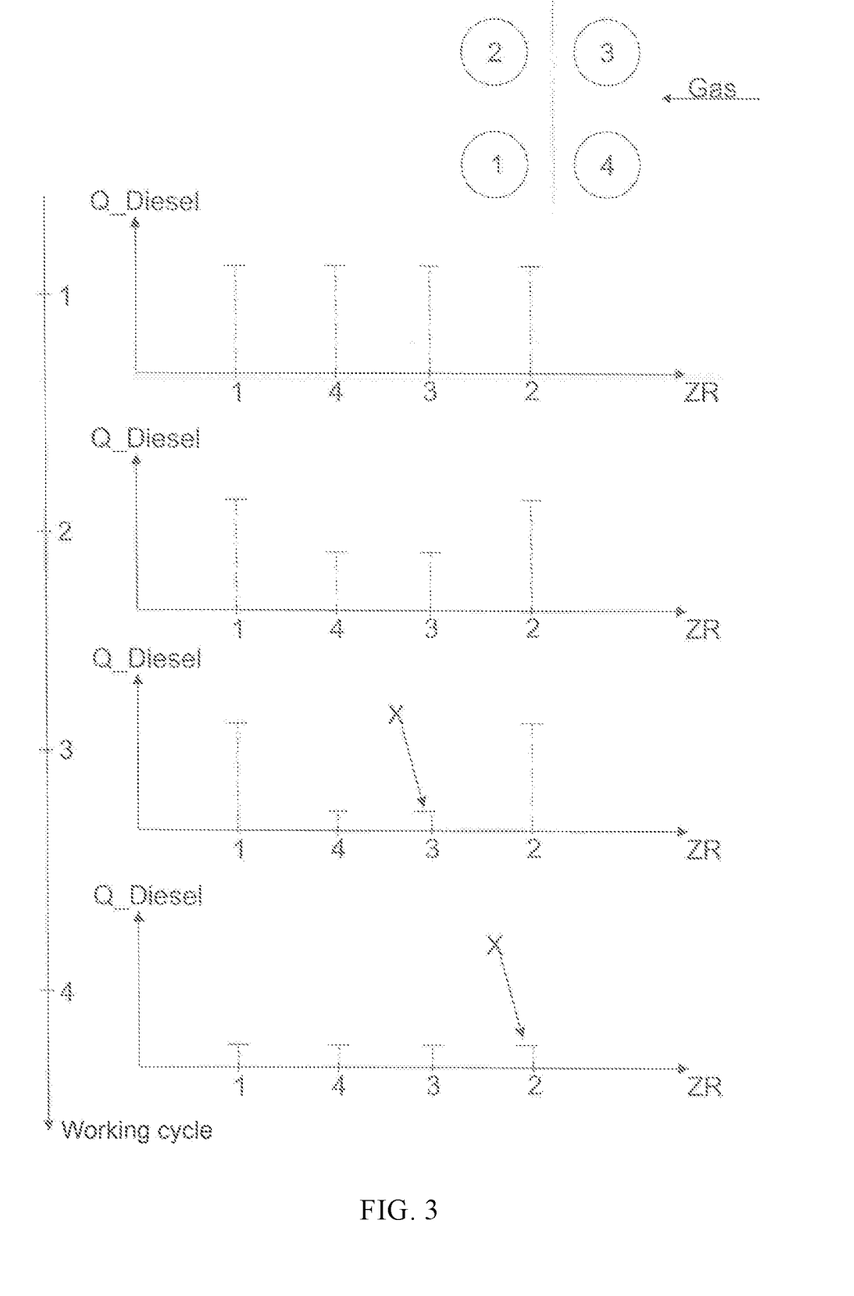
FIGS. 3A and 3B show a further simplified exemplary embodiment for the better understanding of the disclosure.

For a better understanding of the disclosure, a further exemplary embodiment is shown in FIGS. 3A and 3B which, for the sake of simplicity, comprises only four combustion chambers. This is shown in FIG. 3A. Again, a gas mixer is provided that is arranged in the figure on the right-hand side of the combustion chambers (again indicated by an arrow labeled "gas").

FIG. 3B shows several diagrams, whereby the injected diesel amount is shown for different work cycles. Four work cycles are shown that, however, do not have to follow one another directly. In practice, it will actually be more common that there are several other work cycles between the work cycles shown. The changes in the diesel amount can thus change continuously or stepwise between the illustrated work cycle. In this exemplary embodiment, the gas amount admixed in the gas mixer is increased at a certain point in time before work cycle 1. In work cycle 1, this increased gas volume has not yet reached the combustion chambers. The diesel amount is therefore not changed for any of the four combustion chambers.

The modified gas volume has reached combustion chambers 3 and 4 in work cycle 2, but has not reached combustion chambers 1 and 2. Therefore, in work cycle 2, the diesel amount for combustion chambers 3 and 4 must be reduced. This can be done stepwise, as shown by the difference between the illustrated work cycles 2 and 3. In a first step (work cycle 2), the diesel amount Q_Diesel of combustion chambers 3 and 4 is reduced by a certain amount. This behavior is continued in work cycle 3 and the diesel amount Q_Diesel intended for the combustion chambers after the changeover is already used in work cycle 3 for combustion chambers 3 and 4.

However, this stepwise withdrawal of the diesel amount Q_Diesel is not absolutely necessary. An abrupt withdrawal of the diesel amount Q_Diesel can also be advantageous.

Following the processes, in work cycle 4 the changed gas amount in the gas-air mixture feed now also reaches combustion chambers 1 and 2. Here, the diesel amount is immediately withdrawn from the amount existing before the changeover at the desired diesel amount Q_Diesel. At this time, the same diesel amount Q_Diesel is then injected again in all combustion chambers 1 to 4.

It should be noted that FIGS. 3a and 3b are purely schematic. In particular, the ratios of the diesel amounts Q_Diesel may differ greatly in practice from the ratios shown here.

In the case of the injection events (work cycle 3, combustion chamber 3 and work cycle 4, combustion chamber 2) provided with the reference symbols X, the ignition sequence ZR shown on the right must also be understood as a time axis. The shifted indicators for the diesel amount Q_Diesel indicate that the injection of the diesel starts earlier than is normally provided. This can be done, for example, in response to an excessively high cylinder pressure or an undesired combustion process.

Figure 4:
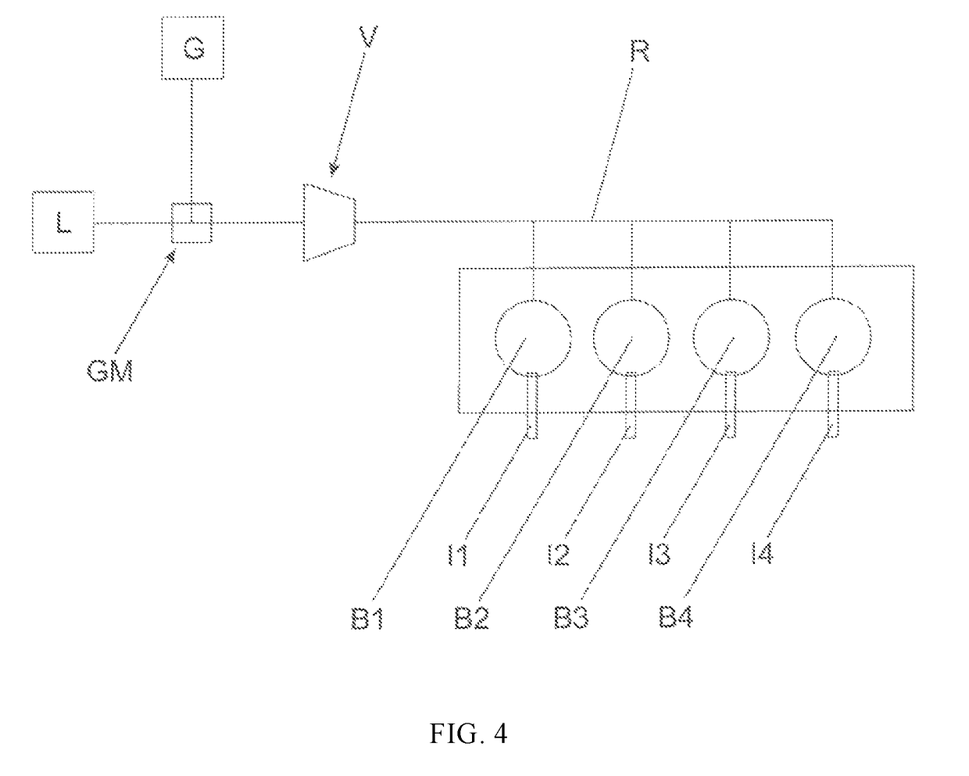
FIG. 4 shows a schematic representation of a dual-fuel internal combustion engine.

FIG. 4 shows schematically a dual-fuel internal combustion engine according to the disclosure. It has four combustion chambers B1 to B4, which can be supplied with liquid fuel, in this case diesel, via the injectors I1 to I4.

To create the gas-air mixture, a central gas mixer GM is provided, which is connected to an air supply L and a gas reservoir G, e.g. a tank. Via a gas-air mixture supply R, the gas-air mixture produced in the central gas mixer GM is fed to the combustion chambers B1 to B4. Downstream of the gas mixer GM, a compressor V of a turbocharger (mixed-charged internal combustion engine) is also provided. However, the gas mixer GM could also be arranged downstream of the compressor V in the air supply (air-charged internal combustion engine). The number of combustion chambers B1 to B4 is purely exemplary.

The disclosure can be used in dual-fuel internal combustion engines with 2, 4, 6, 8, 10, 12, 14, 16, 18, 20, 22 or 24 combustion chambers. Reciprocating piston engines can be used, i.e. the combustion changes are arranged in piston cylinder units.

The disclosure can be used in a stationary internal combustion engine, for marine applications or mobile applications such as so-called "non-road mobile machinery" (NRMM), as a reciprocating piston engine. The internal combustion engine can be used as a mechanical drive, e.g. for operating compressor systems or coupled with a generator to a genset for generating electrical energy.

What is claimed is:

1. A dual-fuel internal combustion engine comprising:
   at least two combustion chambers having a first combustion chamber positioned a first distance from at least one gas mixer for producing a gas-air mixture and a second combustion chamber positioned a second distance from the at least one gas mixer, wherein the first distance and the second distance are different from one another;
   an intake valve for the gas-air mixture;
   an injector for liquid fuel assigned to each of the at least two combustion chambers; and
   a control device, in a change-over mode, configured to change an amount of energy supplied to the at least two-combustion chambers through the gas-air mixture in a first direction and configured to change an amount of liquid fuel supplied to the at least two combustion chambers in an opposite second direction;
   wherein the control device is configured to determine a first time delay for the change in the amount of liquid fuel in the second direction for the first combustion chamber based on the first distance and configured to determine a second time delay for the change in the amount of liquid fuel in the second direction for the second combustion chamber based on the second distance, and wherein the first time delay and the second time delay are different from one another.

2. The dual-fuel internal combustion engine according to claim 1, wherein the control device is configured to determine a time delay for the change in the amount of liquid fuel for the at least two combustion chambers according to an individual distance of the respective combustion chamber from the at least one gas mixer.

3. The dual-fuel internal combustion engine according to claim 1, wherein the control device is configured to organize the at least two combustion chambers into at least two groups, with the at least two groups having a different distance from the at least one gas mixer, wherein the control device is configured to determine a first time delay for the change in the amount of liquid fuel for a first group of the at least two groups according to a first distance between the first group and the at least one gas mixer and configured to determine a second time delay for the change in the amount of liquid fuel for a second group of the at least two groups according to a second distance between the second group and the at least one gas mixer.

4. The dual-fuel internal combustion engine according to claim 3, wherein the control device is configured to determine a setpoint value of a start of an injection of the liquid fuel into the first combustion chamber of the at least two combustion chambers based on the first combustion chamber being organized in the first group or the second group.

5. The dual-fuel internal combustion engine according to claim 1, wherein the control device is configured to select a time interval between the change in the first direction and the change in the second direction based on an ignition sequence.

6. The dual-fuel internal combustion engine according to claim 1, wherein the control device is configured to correct a start of an injection of the liquid fuel into a combustion chamber of the at least two combustion chambers based on a mixture temperature present in the combustion chamber, a knocking tendency expected in the combustion chamber, or both.

7. The dual-fuel internal combustion engine according to claim 1, comprising at least one cylinder pressure sensor configured to measure a pressure flow in the at least two combustion chambers, wherein signals from the at least one cylinder pressure sensor are directed to the control device, and wherein the control device is configured to correct the change in the amount of liquid fuel, a start of an injection of the liquid fuel into one combustion chamber of the at least two combustion chambers, or both based on the signals of the at least one cylinder pressure sensor.

8. The dual-fuel internal combustion engine according to claim 1, wherein the control device is configured to select a time interval between the change in the second direction and the change in the first direction according to a change in a substitution rate, a start of an injection of the liquid fuel, or both.

9. A method for operating a dual-fuel internal combustion engine, comprising:
   supplying an amount of energy to at least two combustion chambers of the dual-fuel internal combustion engine by a gas-air mixture, wherein the at least two combustion chambers comprise a first combustion chamber positioned a first distance from at least one gas mixer configured to supply the gas-air mixture to the at least two combustion chambers and a second combustion chamber positioned a second distance from the at least one gas mixer, and wherein the first distance and the second distance are different from one another; and
   changing the amount of energy supplied to the at least two combustion chambers via the gas-air mixture in a first direction and changing an amount of liquid fuel supplied to the at least two combustion chambers in an opposite, second direction;
   determining a first time delay for the change in the amount of liquid fuel in the second direction for the first combustion chamber of the at least two combustion chambers based on the first distance; and
   determining a second time delay for the change in the amount of liquid fuel in the second direction for the second combustion chamber of the at least two combustion chambers based on the second distance, wherein the first time delay and the second time delay are different from one another.

10. The method of claim 9, comprising organizing the at least two combustion chambers into at least two groups, wherein the first combustion chamber is in a first group of the at least two groups and the second combustion chamber is in a second group of the at least two groups.

11. The method of claim 10, wherein the first time delay for the change in the amount of liquid fuel in the second direction for the first combustion chamber is used for each combustion chamber in the first group of the at least two groups, and wherein the second time delay for the change in the amount of liquid fuel in the second direction for the second combustion chamber is used for each combustion chamber in the second group of the at least two groups.

12. The method of claim 9, wherein changing the amount of liquid fuel supplied to the at least two combustion chambers in the second direction comprises changing the amount of liquid fuel supplied to the at least two combustion chambers in the second direction in response to the change in the amount of energy supplied to the at least two combustion chambers via the gas-air mixture exceeding a threshold value.

13. The method of claim 9, wherein determining the first time delay for the change in the amount of liquid fuel in the second direction for the first combustion chamber of the at least two combustion chambers is further based on an ignition sequence of the first combustion chamber in relation to the remaining at least two combustion chambers.

14. The method of claim 9, wherein determining the first time delay for the change in the amount of liquid fuel in the second direction for the first combustion chamber of the at least two combustion chambers is further based on a mixture temperature present in the first combustion chamber, a knocking tendency of the first combustion chamber, or both.

15. The method of claim 9, comprising measuring a pressure flow in the first combustion chamber via at least one cylinder pressure sensor.

16. The method of claim 15, wherein determining the first time delay for the change in the amount of liquid fuel in the second direction for the first combustion chamber of the at least two combustion chambers is further based on signals from the at least one cylinder pressure sensor.

17. The method of claim 9, wherein changing the amount of liquid fuel supplied to the at least two combustion chambers in the second direction comprises a stepwise change.

18. The method of claim 9, wherein supplying the amount of energy to the at least two combustion chambers of the dual-fuel internal combustion engine by the gas-air mixture comprises compressing the gas-air mixture prior to the at least two combustion chambers via a turbocharger.

19. The method of claim 9, wherein determining the first time delay for the change in the amount of liquid fuel in the second direction for the first combustion chamber of the at least two combustion chambers is further based a change in a substitution rate, a start of an injection of the liquid fuel, or both.

20. A system, comprising:
a first combustion chamber positioned a first distance from at least one gas mixer configured to produce a gas-air mixture;
a second combustion chamber positioned a second distance from the at least one gas mixer, wherein the first distance and the second distance are different from one another; and
a control device configured to initiate a change-over mode, wherein the control device is configured to change an amount of energy supplied to the first and second combustion chambers through the gas-air mixture in a first direction in the change-over mode, and wherein the control device is configured to change an amount of liquid fuel supplied to the first and second combustion chambers in a second direction, opposite the first direction, in the change-over mode;
wherein the control device is configured to determine a first time delay for the change in the amount of liquid fuel in the second direction for the first combustion chamber based on the first distance, and wherein the control device is configured to determine a second time delay for the change in the amount of liquid fuel in the second direction for the second combustion chamber based on the second distance, and wherein the first time delay and the second time delay are different from one another.

* * * * *